No. 897,853. PATENTED SEPT. 1, 1908.
H. J. VOM SCHEIDT.
TRUCK.
APPLICATION FILED NOV. 16, 1907.
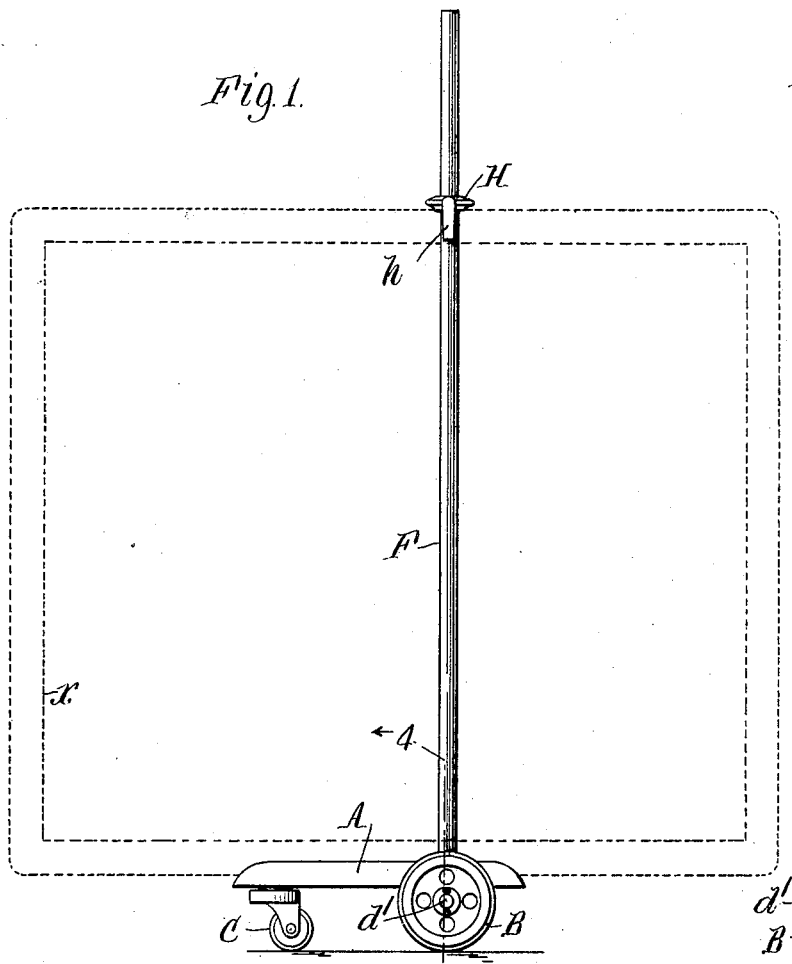
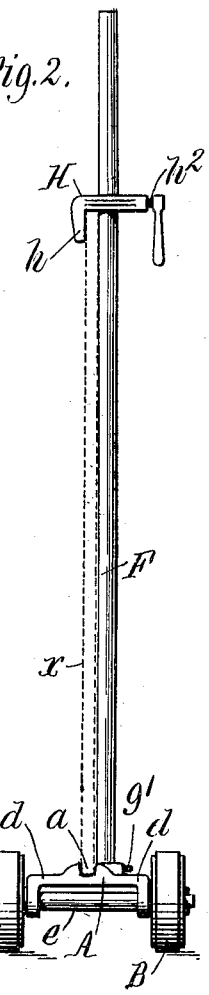
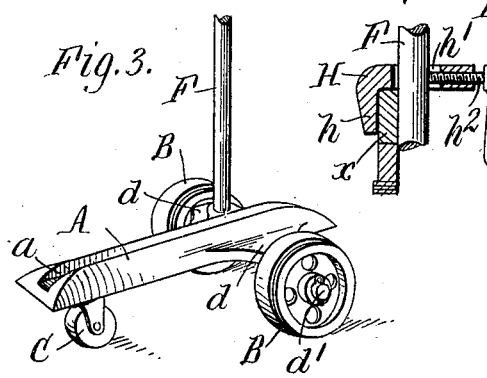
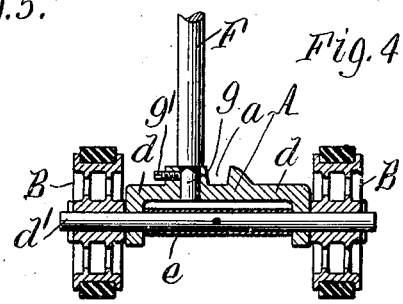
Witnesses:
E. A. Volk.
A. G. Dimond.
Inventor.
Henry J. vom Scheidt,
By Wilhelm, Parker & Hand
Attorneys.

UNITED STATES PATENT OFFICE.

HENRY J. VOM SCHEIDT, OF BUFFALO, NEW YORK.

TRUCK.

No. 897,853.  Specification of Letters Patent.  Patented Sept. 1, 1908.

Application filed November 16, 1907.  Serial No. 402,441.

*To all whom it may concern:*

Be it known that I, HENRY J. VOM SCHEIDT, a citizen of the United States, residing at Buffalo, in the county of Erie and State of New York, have invented a new and useful Improvement in Trucks, of which the following is a specification.

This invention relates more particularly to improvements in trucks which are intended for use in moving printers' chases or frames containing set type, but the improvements are not necessarily limited to trucks for this purpose. In moving chases and frames of this type, it is desirable to keep the same in an upright position and move them edgewise to prevent the type from being disarranged by contact with any object.

The object of this invention is to provide a truck of simple construction for this purpose in which the chase can be placed on edge and secured in upright position, so that it can be moved about with ease and without danger of disarranging the type and can be left standing in the truck until required for use.

In the accompanying drawings: Figure 1 is a side elevation of a truck embodying the invention, the chase being shown in position thereon by dotted lines. Fig. 2 is an end elevation thereof. Fig. 3 is a fragmentary perspective view thereof. Fig. 4 is a cross section thereof, on an enlarged scale, in line 4—4, Fig. 1. Fig. 5 is a cross section of the clamping device.

Like reference characters refer to like parts in the several figures.

A represents the main frame or base of the truck which is preferably of oblong shape and provided in its upper side with a central groove or channel $a$ extending lengthwise which is adapted to receive one edge of a chase or frame $x$ to be carried by the truck, the groove being of a width to closely embrace the edge of the chase or frame. The base is supported by two side wheels B at one end and a swiveled wheel or caster C at the opposite end. In the construction shown the base is provided near one end with lateral extensions or arms $d$ having depending end bearing lugs through which extends an axle $d'$ for the wheels B. The wheels are journaled on the projecting ends of the axle outside of the bearing lugs and are held thereon by cotter pins or other ordinary means. Cast metal wheels B are shown provided with rubber tires for decreasing the jar and noise occasioned by rolling the truck over the floor. A sleeve $e$ surrounds the central portion of the axle $d'$ between the bearing lugs and is keyed or otherwise secured to this axle to prevent endwise movement thereof.

F represents a standard or upright which is suitably secured to and rises from the base A adjacent to one side of the groove $a$ and is preferably located directly over the axle $d'$ to give greater strength and stability to the construction. In the construction shown, this standard is provided with a reduced lower end portion $g$ which fits snugly in a hole in the base A in which it is secured and held from turning by a set screw $g'$ or other suitable means.

Upon the standard F is slidably mounted a clamp H having at one end a hook $h$ which is adapted to engage the upper edge of the chase or other frame carried by the truck. This clamp is provided with a hole or opening $h'$ through which the standard F passes and which is of sufficient size to allow the clamp to move laterally or sidewise of the truck on the standard. A set screw $h^2$ provided with a suitable handle for turning the same, is screwed in a threaded hole in the clamp H and is adapted to engage the standard F. By tightening this set screw, the edge of the chase or frame engaged by the hook $h$ is clamped firmly against the standard. When the set screw is released, the clamp can be moved freely up or down upon the standard and to any desired position.

In using the truck the chase or frame is placed on the truck in an upright position with one edge thereof resting in the groove $a$ in the top of the base. The clamp H is then adjusted on the standard so that its hook engages the upper edge of the chase or frame and its set screw is tightened to clamp the chase or frame against the standard. The chase or frame is thus firmly secured in an upright position in the truck and can be moved about as desired and can also be left standing in the truck until required for use in the press.

It is obvious that a truck of this construction can be used with advantage for other purposes where the object to be moved is analogous in shape to a frame or chase and it is desirable to hold the same upon the truck in an upright or vertical position.

I claim as my invention:

1. In a truck for printers' forms and the like, the combination of a wheeled base having a horizontal supporting top, engaging means on said top forming a seat for said form and holding the same against lateral movement, a standard secured on said base at one side of said engaging means, and a securing device on said standard for engaging the upper portion of said form, substantially as set forth.

2. In a truck, the combination of a wheeled base, a groove extending lengthwise thereof on its upper side, a standard secured on said base at one side of said groove, and an adjustable clamp arranged on said standard for engaging an object supported on said base, substantially as set forth.

3. In a truck, the combination of a wheeled base, a groove extending lengthwise thereof on its upper side, a standard secured on said base adjacent to one side of said groove, and an adjustable clamp arranged on said standard above said base, substantially as set forth.

Witness my hand in the presence of two subscribing witnesses.

HENRY J. VOM SCHEIDT.

Witnesses:
EDWARD WILHELM,
C. B. HORNBECK.